[72] Inventors Richard A. Hein
Skokie;
Mark A. Hunter, Evanston; Alf J. Olsen,
Elk Grove Village, all of Ill.

[21] Appl. No. 889,099
[22] Filed Dec. 30, 1969
[45] Patented Dec. 28, 1971
[73] Assignee Teletype Corporation
Skokie, Ill.

[54] INCREMENTAL TAPE DRIVE CONTROLLED BY PRERECORDED CLOCK TRACK
6 Claims, 2 Drawing Figs.

[52] U.S. Cl. .......... 340/174.1 A, 340/174.1 G, 340/174.1 H
[51] Int. Cl. .......... G11b 15/18, B65h 17/22
[50] Field of Search .......... 340/174.1 A, 174.1 G, 174.1 H

[56] References Cited
UNITED STATES PATENTS

| | | | |
|---|---|---|---|
| 3,474,429 | 10/1969 | McCowden et al. | 340/174.1 G |
| 3,275,208 | 9/1966 | Poumakis | 340/174.1 A |
| 3,454,930 | 7/1969 | Schoeneman | 340/174.1 A |

*Primary Examiner*—Bernard Konick
*Assistant Examiner*—J. Russell Goudeau
*Attorneys*—J. L. Landis and R. P. Miller

ABSTRACT: A plurality of electromagnetic transducers for recording in magnetic medium supported on a moveable carrier are arranged in a record head in alignment with a magnetic sensor which is responsive to a clock track in said medium. An effect generated by the sensor in response to a sensed mark in the clock track simultaneously orders (1) transmission of intelligence to writing amplifiers, (2) discharge of the amplifiers to said transducers for recording said intelligence and (3) cycling of a timer. Upon completion of its cycle, the timer orders (1) drive to the carrier terminated for reinitiation in response to availability of intelligence for recordal and (2) resetting of a data register for receiving new intelligence.

Patented Dec. 28, 1971 3,631,427

INVENTORS
RICHARD A. HEIN
MARK A. HUTNER
ALF J. OLSEN

BY Sherman P. Appel
ATTORNEY

INCREMENTAL TAPE DRIVE CONTROLLED BY PRERECORDED CLOCK TRACK

BACKGROUND OF THE INVENTION

This invention relates to recording magnetically. Particularly it relates to the production of records having high character density.

In a computer, the requirement for space economy dictates that its memory or intelligence storage be minimally proportioned physically. When the intelligence carrier is a tape or a disc with a magnetic medium, the requirement is satisfied by maximizing the density of encoded analogs, each of which is representative of a character.

Compacting intelligence on a carrier of such type creates a problem of locating any specific code combination should there be a need for amendment of a record. The difficulty arises because the position of recordal of each analog, according to heretofore known art, is a function of a condition of a mechanical member which in turn is associated with the carrier or medium, rather than a direct function of the carrier or medium, itself. For example, in one prior tape recorder for generating a computer storage, successive orders to write each character analog in the magnetic medium on a tape comes from a stepping motor which is drivingly coupled to a capstan for incrementally advancing the tape. In another heretofore known tape recorder adapted for providing computer storage, successive write orders are received electrically in response to angular condition of a photodisc carried from the shaft of a tape-driving capstan.

The likelihood of correlating any position on a tape, after a record has been made, with an original condition of a stepping motor, or the angular position of a capstan or a photodisc for determining the location of a recorded code combination is remote. One factor vitiating reregistration, is slippage between a tape and capstan and another factor is stretching of web material under tension. Such factors produce a continually increasing error in relative displacement of a driven tape and its capstan as a function of time.

Even greater difficulty is encountered, using heretofore known techniques, in locating a specific recorded code combination on apparatus other than the device used for making the recording. Then, additional variations, such as differences in capstan diameters and coefficients of friction tend to prevent accurate correlation of a position along a track with a given angular condition of a member associated with driving the carrier.

Because of the dim expectancy for quickly, accurately locating any code combination on a magnetic track according to any heretofore known teaching, correction or amendment of an existing record, according to past practice, involves erasure of magnetic medium across a track segment, greater in length than the segment occupied by the material sought to be removed. To minimize the extent of needless destruction of "good" recorded intelligence, when amending, intermittent spaces in the medium are provided between blocks of intelligence. Such provision countervails the space economy achieved by intelligence compacting.

It is an object of the present invention to provide an improved magnetic recording process.

It is a further object of the invention to enable improved compacting of intelligence in a recording medium.

It is another object of the invention to facilitate amending an intelligence storage, particularly storage along a track.

It is an additional object of the invention to provide improved apparatus for recording in a magnetic medium.

It is yet a further object of the invention to correlate the position of any code combination on a track in an intelligence storage with a reference along the track.

Moreover, it is an object of the invention to correlate the place on a track of a magnetically recorded code combination with an indicator on the carrier for the magnetic medium.

SUMMARY OF THE INVENTION

To effect the foregoing, and other objects of the invention which will become apparent hereinafter, an improved process for recording is responsive to an electrical effect generated by a clock track on a record carrier. The response comprises transmitting a plurality of pulses corresponding to a code combination to a plurality of electromagnetic transducers for recording in a magnetic medium on said carrier, and changing the moving relationship between the carrier and said transducers following each transmittal of pulses.

Considered from another aspect the foregoing and said other objects can be achieved with improved apparatus for recording magnetically on a carrier and having a plurality of aligned electromagnetic transducers mounted for disposition in operative association with the carrier. One of said transducers is conditioned in a sensing mode. The others of said transducers are conditioned for recording. Means are provided for driving the carrier past the transducers. Other means are adapted for changing the state of the moving relationship between the carrier and said transducers in response to marks on a clock track on the carrier. Still other means are adapted for transmitting intelligence for recordal through said transducers in response to the clock track.

BRIEF DESCRIPTION OF THE DRAWINGS

In the ensuing detailed description reference is made to the accompanying drawings of which.

DETAILED DESCRIPTION OF THE ILLUSTRATED EMBODIMENT

Figures 1, 2:
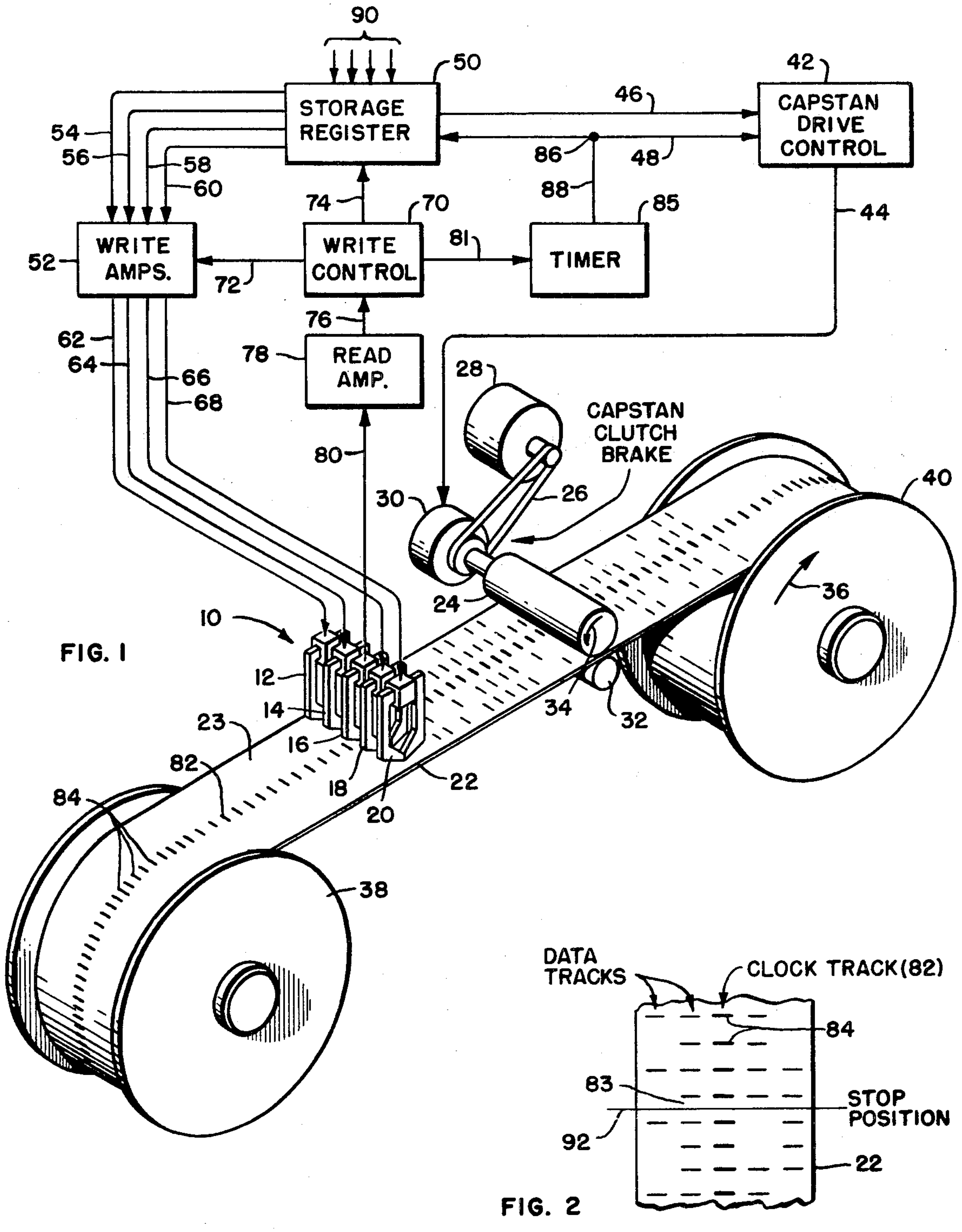
FIG. 1 is a scheme of apparatus shown partially in perspective and embodying the invention.
FIG. 2 is an enlarged view of a segment of a carrier for a record produced according to the invention.

Referring now more particularly to FIG. 1, the exemplary recording apparatus therein shown comprises a head 10 in which a plurality of electromagnetic transducers 12, 14, 16, 18, and 20 of the type used for magnetic recordings are supported, mounted or arranged in alignment, each with the others thereof. Said transducers may be of conventional construction, with transducer 16 conditioned for playing, being in a sensing mode; while the remainder of the transducers 12, 14, 18, and 20 are conditioned for recording or in a writing mode. In a simplified embodiment illustrated, only four recording heads are shown (12, 14, 18, 20), whereas in practical use in printing telegraphy, a total of eight parallel recording heads are provided, responsive to standard eight-level signals. Head 10 is mounted such that the transducers will be in operative association or alignment with a magnetic medium 23 supported on the head proximate surface of a carrier 22 for magnetic records. The exemplary carrier is a tape or web of conventional plastic fabrication, but it may be a disc or an equivalent member.

Means for driving carrier 22 past head 10 comprises a drive number or capstan 24 which is coupled through a pulley system 26 to prime mover means herein shown as a motor 28. A pinch roller 32 is mounted in opposed association with capstan 24 for frictionally gripping therebetween, and driving carrier 22 in the direction implicit from arrows 34 and 36 from a supply reel 38 onto a take up reel 40.

A clutch/brake combination 30, which may be of any known construction having the capability of stopping at any point, is arranged along the drive train and comprises means for controlling capstan drive and for changing the moving relationship between carrier 22 and head 10. Construction 30 may be conventional and herein is such that, when its clutch is engaged, the motor is drivingly coupled to the capstan and the brake is inoperative; and when the brake is operated, drive to the capstan is restrained and the clutch is released for uncoupling the motor and the capstan.

Means for controlling capstan drive and accordingly the moving relationship between carrier 22 and head 10 also includes circuitry 42, the effects of which are exercised on clutch/brake combination 30 through an electrical conductor 44. To that end circuitry 42 has a first condition in which the clutch of said combination is engaged and the brake is released for driveably coupling capstan 24 to motor 28 and a second condition in which said clutch is released, thereby uncoupling the capstan and said motor, and the brake is operated for stopping the capstan and, accordingly, drive to carrier 22. The condition of circuitry 42 is governed by the character of an input coupled thereto through an input lead 46 and an electrical conductor 48.

A data storage register 50 herein is shown as responsive to a four level permutation code and may be of any heretofore known construction having four bits or storage components (not shown) and compatible with the other equipment described hereafter. The character of the storage register is such that a zero voltage condition prevails at each of its storage components if no data is present, Accordingly, in such system, a voltage at any storage component is indicative of the presence of data or intelligence. The register may include an OR gate (not shown) by reason of which a voltage output will be imposed on circuitry 42 through lead 46 each time a code combination (other than a zero condition) is present in the register, thereby to generate said first condition of circuitry 42.

Data storage components of data storage register 50 are also connected to and adapted to impose their voltages on writing amplifier means, herein comprised of four writing amplifiers (not individually shown) in a bank 52, through a plurality of electrical conductors 54, 56, 58, and 60, respectively. The amplifiers of said bank are adapted to discharge through channels comprising electrical conductors 62, 64, 66, and 68, respectively, for producing magnetomotive effects in transducers 12, 14, 18, and 20 for writing in magnetic medium 23.

However, the structure of the amplifiers of bank 52 is such that signal emission from said bank will occur only on order from write control means comprising a circuit 70 even though intelligence is available in the data storage register. To that end, an electrical conductor 72 connects the output of write control circuit 70 to said bank. A conductor 74 also connects the output of write control circuit 70 to data storage register 50. The structure of its storage elements are such that it will generate an effect through conductors 54, 56, 58, and 60 only upon a "present data" order from said write control circuit through conductor 74.

The input to write control circuit 70 comprises the output from a reading amplifier 78 and is effected through a lead 76 in response to a signal from transducer 16. A conductor 80 comprises the signal channel for transmission of induced electrical effects from said transducer 16 to said reading amplifier. The arrangement is such that, substantially simultaneously with induction of an effect in conductor 80, the write control circuit will produce outputs through conductors 72 and 74 and a third conductor 81.

According to the present invention, carrier 22 has a magnetic clock track 82 which is comprised of a plurality of like magnetic marks 84 (only some of which are numbered in FIG. 2) in the magnetic medium 23. The marks are uniformly spaced apart longitudinally of the carrier or the path of carrier travel and each adjacent pair defines a data storage area 83. The track herein is disposed at a selected position medially of the opposite sides of the carrier to the end that transducer 16 will be aligned with successive marks 84 as the carrier is driven. The structure of marks 84 is such that as each is sensed, that is, brought adjacent the magnetic gap of transducer 16, a pulse or an electrical effect will be induced as a sensor output through conductor 80.

The output through conductor 81 is effective for initiating cycling of a timer 85. A signal generated by the latter at the completion of its cycle, comprises a pair of simultaneous inputs to capstan drive control circuitry 42 and data storage register 50 via conductor 48 to which the timer is connected at a terminal 86 by a lead 88. The signal from timer 85 imposes on capstan drive circuitry 42 its second condition and imposes on storage register 50, by means which may be well known, a voltage for resetting register storage elements (not shown) to a no code or no data condition for reception of an ensuing code combination from a data input source 90.

METHOD OF OPERATION

When intelligence in the form of a code combination or permutation code, (which may be an encoded analog of an alphanumeric character) is available at the storage elements of data storage register 50, a voltage is effected through input lead 46 to impose said first condition (energize the clutch of clutch/brake unit 30) on capstan drive control circuitry 42 whereby carrier 22 is capstan driven responsive to the availability of intelligence. Such movement will cause a mark 84 upstream of transducer 16 to move downstream into and through a sensed position in alignment with transducer or sensor 16. In response to an electrical effect which is generated or induced by the sensor in consequence of such sensed mark 84, a voltage will be imposed on write control 70 by reading amplifier 78. Thereupon, said write control circuit simultaneously will (1) "command" data storage register to present data to the amplifiers of bank 52, (b) "command" the writing amplifiers of the bank 52 to transmit the presented data to transducers 12, 14, 18, and 20 for recording or writing on then moving carrier 22, and (c) start timer 85. When the latter times out, it generates a voltage effective through conductor 48 for (a) imposing said second condition (energize the brake of clutch/brake unit 30) on capstan drive control circuitry 42, thereby changing the moving relationship between the carrier 22 and the transducers by causing the carrier to stop and (b) resetting storage register 50.

The length of the timer cycle is sufficient to permit writing of all of a code combination then present in the register and which was responsible for initiation of web drive in a data storage area 83. That is to say, the spacing of marks 84 is such that each code combination s fully recorded before any mark 84 upstream of a sensed mark is moved into a sensed position. Practically, it has been found that a carrier stop position 92 relative head 10 and midway between marks 84 provides ample allowance for preventing any code combination from extending beyond its data storage area 83.

Apparatus according to the present invention has produced computer memories in tape carried magnetic medium with a density of 125 code combinations per lineal inch. Moreover, such apparatus has a capability of recording over 300 characters per second. Of further significance, however, is the facility provided by the invention for quickly and accurately locating any recorded code combination by reference to a mark 84. Such facility, moreover, enables ready location of any recorded code combination on any machine capable of managing the carrier and is not limited to the apparatus on which the record was made.

Furthermore, considered from another aspect, no longer is it necessary to consider a condition of a mechanical member mechanically linked or associated with the carrier as a location reference for a recorded code combination. By this invention, need for providing blank spaces between blocks of intelligence to facilitate amending an intelligence storage is obviated, in consequence of which greater intelligence compacting than has been heretofore practical may be achieved.

As many modifications in the described construction and process could be conceived, and as many changes could be made therein without departing from the spirit and scope of the claims, it is intended that all matter contained in the accompanying specification shall be considered as illustrative only and not in a limiting sense.

We claim:

1. A recording process comprising:

a. initiating movement of a multichannel carrier for magnetic records in response to availability in a register of any intelligence to be recorded;

b. transferring such intelligence to writing transducers in response to one of a plurality of equally spaced clock-track marks prerecorded on one channel of said carrier; and c. stopping carrier movement after each intelligence transfer and in response to said mark at a predetermined stop position located between successive clock-track marks.

2. A process according to claim 1 in which the step of stopping carrier movement comprises the expedients of:

actuating a time-delay mechanism in response to said mark;

actuating a drive control circuit in response to said time-delay mechanism; and braking carrier drive movement and uncoupling the carrier drive from a prime mover in response to said drive control circuit.

3. In a process of recording information on a multichannel magnetic tape, of the type wherein a clock-track consisting of equally spaced magnetic clock-track marks is prerecorded on one channel of the tape, and wherein the recording process includes incrementally advancing the tape, sensing the next clock-track mark with a sensing transducer aligned with the clock-track, and actuating a bank of recording transducers aligned with the sensing transducer in response to the sensing of the clock-track mark to record information on the remaining channels in predetermined positions with respect to the clock-track marks, the improvement comprising:

energizing a time-delay circuit in response to the sensing of the clock-track mark by the sensing transducer to provide a delayed output signal a predetermined time after the sensing of the clock-track mark and after the recording of information by the recording transducers; and stopping the advancement of the tape in response to the delayed output signal from the time-delay circuit so that the tape stops before the next clock-track mark advances to the sensing transducer and at a predetermined stop position located between successive clock-track marks a distance set by the time-delay and controlled solely by the clock-track marks on the tape.

4. A process as recited in claim 3, further comprising:

applying the delayed output signal also to reset a storage register responsive to the combination of any additional information to be recorded and the delayed output signal to provide a cycle-starting signal; and advancing the tape another step in response to the cycle-starting signal, so that the tape steps automatically after the time-delay in response to each clock-track mark so long as any further information is available for recording.

5. In an apparatus for recording information on a multichannel magnetic tape, of the type wherein a clock-track consisting of equally spaced magnetic clock-track marks in prerecorded on one channel of the tape, and including a capstan for incrementally advancing the tape, a sensing transducer aligned with the clock-track for sensing the next clock-track mark as the tape advances, and a bank of recording transducers aligned with the sensing transducer and actuated in response to the sensing of the clock-track mark to record information on the remaining channels in predetermined positions with respect to the clock-track marks, the improvement comprising:

a time-delay circuit;

means for energizing the time-delay circuit in response to the sensing of the clock-track mark by the sensing transducer so that the time-delay circuit provides a delayed output signal a predetermined time after sensing of the clock-track mark and after the recording of information by the recording transducers;

a brake unit for stopping the advancement of the tape; and means for applying the delayed output signal from the time-delay circuit to the brake unit so that the tape stops before the next clock-track mark advances to the sensing transducer and at a predetermined stop position located between successive clock-track marks a distance set by the time-delay and controlled solely by the clock-track marks on the tape.

6. Apparatus as recited in claim 5, further comprising:

an information-storage register;

means for applying information to be recorded to the register as one input;

means for applying the output signal from the time-delay circuit to the register as a second input to reset the register, the register being arranged to provide a cycle-starting signal in response to the combination of any additional information to be recorded and the delayed output signal; and means for starting the capstan to advance the tape another step in response to each cycle-starting signal so that the tape steps automatically after the time-delay in response to each clock-track mark so long as any further information is available for recording.

* * * * *

PO-1050
(5/69)

UNITED STATES PATENT OFFICE
CERTIFICATE OF CORRECTION

Patent No. 3,631,427 Dated December 28, 1971

Inventor(s) Richard A. Hein, Mark A. Hutner, Alf J. Olsen

It is certified that error appears in the above-identified patent and that said Letters Patent are hereby corrected as shown below:

Column 6, line 6, after "marks", change "in" to --is--.

Signed and sealed this 11th day of July 1972.

(SEAL)
Attest:

EDWARD M.FLETCHER,JR.
Attesting Officer

ROBERT GOTTSCHALK
Commissioner of Patents